United States Patent [19]
Gucyski

[11] Patent Number: 5,637,988
[45] Date of Patent: *Jun. 10, 1997

[54] SWITCHING POWER SUPPLY ATTAINING SINUSOIDAL INPUT CURRENT

[76] Inventor: Jeff Gucyski, P.O. Box 11633, Costa Mesa, Calif. 92627

[*] Notice: The term of this patent shall not extend beyond the expiration date of Pat. No. 5,164,656.

[21] Appl. No.: 486,626

[22] Filed: Jun. 7, 1995

Related U.S. Application Data

[63] Continuation of Ser. No. 224,136, Apr. 6, 1994, abandoned, which is a continuation of Ser. No. 975,346, Nov. 16, 1992, abandoned, which is a division of Ser. No. 393,391, Aug. 14, 1989, Pat. No. 5,164,656.

[51] Int. Cl.$^6$ ............................................. H02M 3/155
[52] U.S. Cl. ......................... 323/222; 323/225; 323/271
[58] Field of Search ............................... 323/222, 223, 323/224, 225, 268, 271, 272, 351; 363/89; H02M 3/155, 3/156, 3/157, 3/158

[56] References Cited

U.S. PATENT DOCUMENTS

| | | | |
|---|---|---|---|
| 3,531,712 | 9/1970 | Cecchini | 323/224 |
| 4,242,629 | 12/1980 | Shuey | 323/222 |
| 4,521,725 | 6/1985 | Phaneuf | 323/282 |
| 4,618,812 | 10/1986 | Kawakami | 323/224 |
| 4,814,685 | 3/1989 | Renger | 323/224 |
| 4,949,234 | 8/1990 | Gulczynski | 363/89 |
| 4,956,760 | 9/1990 | Gulczynski | 363/80 |
| 4,999,568 | 3/1991 | Gulczynski | 323/351 |
| 5,006,782 | 4/1991 | Pelly | 323/225 |
| 5,038,267 | 8/1991 | De Doncker et al. | 363/89 |
| 5,057,990 | 10/1991 | Gulczynski | 323/350 |
| 5,146,399 | 9/1992 | Gucyski | 363/89 |
| 5,155,430 | 10/1992 | Gulczynski | 323/224 |
| 5,164,656 | 11/1992 | Gulczynski | 323/222 |

Primary Examiner—Jeffrey L. Sterrett

[57] ABSTRACT

The switching power supply attains sinusoidal input current even at a low level of the input voltage. One capacitor is grounded and stores an intermediate voltage. One switch selectively applies the intermediate voltage to a node. A grounded diode is coupled to the node. An inductor is coupled to the node for attaining a current. Another switch selectively applies the current to the input terminal. A rectifier applies the current to the output terminal. Another capacitor is coupled between the output terminal and the one capacitor for storing and providing the output voltage.

4 Claims, 4 Drawing Sheets

SWITCHING POWER SUPPLY ATTAINING SINUSOIDAL INPUT CURRENT

CROSS REFERENCE TO RELATED INVENTIONS

This application is a continuation of application Ser. No. 224,136 filed Apr. 6, 1994, now abandoned, which is a continuation of application Ser. No. 975,346 filed Nov. 16, 1992, now abandoned, which is a division of application Ser. No. 393,391 filed Aug. 14, 1989, now U.S. Pat. No. 5,164,656.

This invention is related to the following U.S. Patents by the same inventor:

"Switching Power Apparatus with 3-State Driver" U.S. Pat. No. 5,270,904 dated Dec. 14, 1993;
"High Power Switching Power Supply with High Power Factor" U.S. Pat. No. 5,267,132 dated Nov. 30, 1993;
"Synchronous Switching Power Supply with Boost and/or Flyback Converters" U.S. Pat. No. 5,225,767 dated Jul. 6, 1993;
"Synchronous Switching Power Supply Comprising Boost or Flyback Converter" U.S. Pat. No. 5,221,887 dated Jun. 22, 1993;
"3-Terminal Bidirectional Switching Power Supply with AC or DC Input and AC or DC Output" U.S. Pat. No. 5,196,995 dated Mar. 23, 1993;
"Synchronous Switching Power Supply Comprising Buck Converter" U.S. Pat. No. 5,164,657 dated Nov. 17, 1992;
"Switching Power Supply with Constant or Sinusoidal Input Current" U.S. Pat. No. 5,164,656 dated Nov. 17, 1992;
"Switching Power Supply with Constant or Sinusoidal Input Current and with Fixed or Variable Output Voltage" U.S. Pat. No. 5,155,430 dated Oct. 13, 1992;
"Capacitive Load Driver with Binary Output" U.S. Pat. No. 5,155,381 dated Oct. 13, 1992;
"Switching Power Apparatus Having High Power Factor and Comprising Pair of Converters for Obtaining Fixed or Variable Output Voltage" U.S. Pat. No. 5,146,399 dated Sep. 8, 1992;
"Bidirectional Switching Power Apparatus with AC or DC Output" U.S. Pat. No. 5,057,990 dated Oct. 15, 1991;
"Switching Power Supply Comprising Pair of Converters for Obtaining Constant or Sinusoidal Input Current and Fixed or Variable Output Voltage" U.S. No. 4,999,568 dated Mar. 12, 1991;
"Ultra Efficient Switching Power Amplifier" U.S. Pat. No. 4,980,649 dated Dec. 25, 1990;
"High Power Switching Power Supply Having High Power Factor" U.S. Pat. No. 4,956,760 dated Sep. 11, 1990;
"High Efficiency Power Factor Correction Circuit" U.S. Pat. No. 4,949,234 dated Aug. 14, 1990;
"High Power Switching Power Supply" U.S. Pat. No. 4,947,308 dated Aug. 7, 1990;
"Power Switch Driver" U.S. Pat. No. 4,940,906 dated Jul. 10, 1990;
"High Efficiency Power Amplifier Comprising Multilevel Power Supply" U.S. Pat. No. 4,871,980 dated Oct. 3, 1989;
"Analog Power Amplifier" U.S. Pat. No. 4,866,398 dated Sep. 12, 1989;
"Synchronous Switching Power Supply with Flyback Converter" U.S. Pat. No. 4,853,837 dated Aug. 1, 1989;
"Switching Circuits Performing Thyristor and Triac Functions" U.S. Pat. No. 4,845,391 dated Jul. 4, 1989;
"Switching Power Supply" U.S. Pat. No. 4,803,610 dated Feb. 7, 1989;
"Power Amplifier" U.S. Pat. No. 4,782,306 dated Nov. 1, 1988;
"Switching Power Amplifier" U.S. Pat. No. 4,763,080 dated Aug. 9, 1988;
"Switching Power Supply" U.S. Pat. No. 4,736,286 dated Apr. 5, 1988; and
"Push-Pull Power Amplifier" U.S. Pat. No. 4,476,441 dated Oct. 9, 1984.

All inventions are by the same inventor.

BACKGROUND OF THE INVENTION

The invention relates to switching power supply (SPS) receiving AC line voltage or DC voltage, particularly for power supply systems requiring high output power, high efficiency and fixed or variable output voltage. Peak currents of switches are smallest possible as to accomplish best possible line and component utilizations. In particular, inrush and surge currents are completely eliminated.

Conventional SPSs convert AC line voltage into DC voltage. In particular, the AC voltage is rectified and further applied to an input capacitor. Charging the capacitor causes inrush current and surge currents every peak of the AC voltage. Pulse width modulation (PWM) is used which results in numerous problems including high circuit complexity, stability problems and significantly higher effective switching frequency. Numerous interference suppressors and protection circuits are inevitable. Power factor correction circuits are employed which further increase complexity and decrease efficiency.

Power factor correction circuits employ a boost switching circuit. Rectified line voltage is applied thereto. Therefore, switching frequency or PWM varies in a large range. The circuit is practically inoperative near line voltage crossover. The voltage provided by the boost circuit is inherently greater than the peak of the line voltage. A troublesome mechanical switch for reducing capacitor voltages is employed. Moreover, an output capacitor is coupled to ground, whereby the inrush current is inevitable.

Power factor defines performance of an SPS. It is a ratio of the SPS output power over input power. The input power is RMS input voltage multiplied by RMS input current. The power factor is often specified only for the correction circuit. In fact, the power factor depends on performance of the entire SPS. A conventional power factor correction circuit simulates sinusoidal input current which is in phase with the line voltage. Therefore, the SPS simulates a resistive load. However, switches of the power factor correction circuit must sustain peak currents at least 1.41 times higher than the RMS input current. The respective control circuit is complicated, wherein many compromises are inevitable.

SUMMARY OF THE INVENTION

One possible input current waveform is constant current. This is also the natural choice since the SPS output current remains usually unchanged during half-wave periods of the line voltage. Moreover, the SPS output voltage or voltages have fixed values. It is therefore desirable to apply a stabilized voltage to a power transformer as to minimize an output ripple current.

The present invention is intended to provide an SPS having a high output power, high efficiency and fixed or variable output voltage. The input voltage may be AC or DC. The high efficiency is achieved by activating a minimum number of switches. Peak currents of the switches are smallest possible as to accomplish best possible line and component utilizations at any time. Preferably, the input current is constant. However, the sinusoidal input current, e.g. with DC current superimposed thereon, can be also accomplished.

The SPS according to the present invention exhibits in particular:
- a constant or sinusoidal (not square-wave) input current within half-waves of line voltage, even with varying output current;
- no inrush current;
- no surge currents;
- one bulk capacitor for storing the energy, also used during power failure;
- universal line voltage and thus the SPS output voltage independent of peak of the line voltage;
- a pair of switches for obtaining the constant input current and SPS output voltage;
- average currents conducted by rectifiers and switches slightly higher than average SPS output current;
- inherent short circuit protection;
- switching at zero voltage and zero current;
- limited turn-on times of the switches;
- possibility of shutting the switches off for any period of time;
- possibility of switching only one switch; and
- no voltage spikes, no transient voltage suppressors, no snubbers, etc.

Moreover, the SPS has the capability of providing a varying output voltage. Therefore, the SPS is perfectly suitable to operate with high performance switching power amplifiers as disclosed in the aforementioned "Ultra Efficient Switching Power Amplifier" U.S. Pat. No. 4,980,649 dated Dec. 25, 1990 and "Switching Power Amplifier" U.S. Pat. No. 4,763,080 dated Aug. 9, 1988, by the same inventor.

In one embodiment the SPS converts input voltage applied between input and ground into output voltage, and comprises: a node; a converter means for converting a voltage appearing between the input and node into a current; a capacitive means responsive to the current and coupled to ground for storing a intermediate voltage and the output voltage; a diode means for coupling the node to ground; and a switching means for selectively applying the intermediate voltage to the node.

In another embodiment the SPS converts input voltage applied to input into output voltage, and comprises: a node; a converter means for converting a voltage appearing between the input and node into the output voltage, and including a first switching means for selectively applying the input voltage; an inductive means for attaining a current; a capacitive means for storing a intermediate voltage; a rectifying means for coupling the inductive means to the first switching means and capacitive means; and a second switching means for selectively applying the intermediate voltage to the node.

In yet another embodiment the SPS converts input voltage into output voltage, and comprises: a node; a first and second input terminals coupled to the input voltage and ground in either order; a first converter means for converting a voltage appearing between the first input terminal and node into the output voltage; a second converter means for converting a voltage appearing between the node and second input terminal into a intermediate voltage, and for applying the intermediate voltage between the node and second input terminal; and a capacitive means for storing the intermediate voltage.

There are three basic configurations for converting a predetermined DC input voltage into a desired DC output voltage. Assuming positive input voltage, three components of these converters are connected to the input, ground and output, respectively:

boost converter—inductor, switch and cathode of diode;
buck converter—switch, anode of diode and inductor; and
flyback converter—switch, inductor and anode of diode.

The DC output voltages provided by the converters require a filtering due to varying output currents. In particular, the boost converter comprises the inductor and diode coupled in series between the input and output. Therefore, coupling a capacitor between the output and ground results in inrush current. According to the present invention, this problem is eliminated by coupling the capacitor between the input and output. The output voltage of the boost converter is higher than the input voltage and varies with momentary value thereof.

With reference to the boost converter, the flyback configuration is established by exchanging the switch for inductor and reversing polarity of the diode. If the input voltage is positive, the flyback converter provides a negative output voltage. With reference to the flyback converter, the buck configuration is established by exchanging the inductor for diode. Therefore, the flyback and buck converters each have switch coupled in series with the input voltage.

Power factor does reflect one possible arrangement. The power factor equal 1 represents resistive load having a fixed value. However, line peak currents are $\sqrt{2}$ or 1.41 times higher than the RMS value. In contrast, a constant input current within each half-wave of the line voltage results in smallest possible peak currents and thus best possible line and component utilizations. Consequently, the load represents a nonlinear resistor having sinusoidal rather than fixed resistance. Peak currents are merely $\pi\sqrt{2}/4$ or 1.11 times higher than the RMS value. Moreover, from the view point of a control circuitry, it is significantly easier to determine a fixed rather than sinusoidal input current. The impedance of the line cord and line, ESR of filter capacitors, dynamic impedance of rectifiers and impedance of EMI filter have significantly reduced effect. Phase shift and problems relating to distortions of line waveform do not exist. A new parameter, e.g. defining linearity of the constant current, should be constituted.

BRIEF DESCRIPTION OF THE DRAWINGS

The present invention will become more clear in conjunction with the accompanying figures throughout which similar references may denote similar parts and of which.

DETAILED DESCRIPTION OF THE INVENTION

Figure 1A:
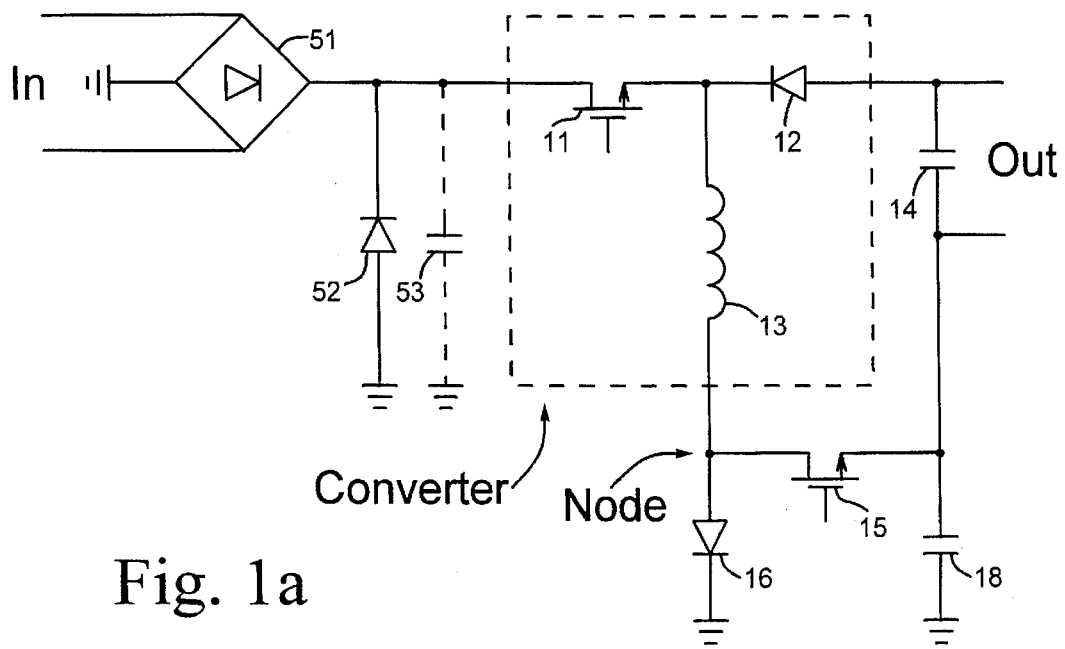
FIG. 1a is an embodiment with a single inductor.

FIG. 1a is an embodiment with a single inductor. The input voltage is AC, e.g. line voltage. Obviously, the SPS also employs an input line filter, not shown for simplicity. The diode bridge 51 is coupled in series with line for obtaining a positive rectified voltage, referred to as V. In particular, V is pulsating and has minimum value substantially equal zero. The SPS includes a converter for converting a voltage appearing between V and a node into a current. The converter includes an inductive means coupled to the node for attaining the current. A capacitive means is coupled to ground for storing and providing a intermediate voltage and the output voltage, in response to the current. The diode 16 couples the node to ground. The n-channel MOSFET 15 selectively applies the intermediate voltage to the node.

The converter is of flyback type. The inductive means consists of the inductor 13 which is coupled to the node for attaining the current. The n-channel MOSFET 11 selectively applies V to the inductor 13. The diode 12 applies the inductor current to the SPS output voltage. The capacitive means consists of the capacitors 14 and 18 which are coupled in series between the diode 12 and ground respectively. The capacitors 14 and 18 constitute a voltage divider, wherein the inductor current is applied thereto. As a result, the SPS output voltage and intermediate voltage appear across the capacitors 14 and 18 respectively. The intermediate voltage and, with reference thereto, SPS output voltage are negative.

When V is above a threshold, the transistor 11 is switched on and off and transistor 15 is open. When the transistor 11 is closed, V is applied across the inductor 13. The diode 12 is reverse biased and diode 16 applies the inductor current to ground. When V is below the threshold, the transistors 11 and 15 are switched on and off. When the transistors 11 and 15 are closed, the diodes 12, 16 are reverse biased and V increased by the voltage stored in the capacitor 18, i.e. intermediate voltage, is applied across the inductor 13. When the transistors 11 and 15 are turned off, the current of the inductor 13 flows thru the diodes 12 and 16 as to charge the capacitors 14 and 18. The capacitor 14 is discharged thru a load coupled thereacross. The capacitor 18 is discharged only when transistors 11 and 15 are closed. An excessive value of the intermediate voltage is prevented by increasing threshold voltage.

Figure 1B:
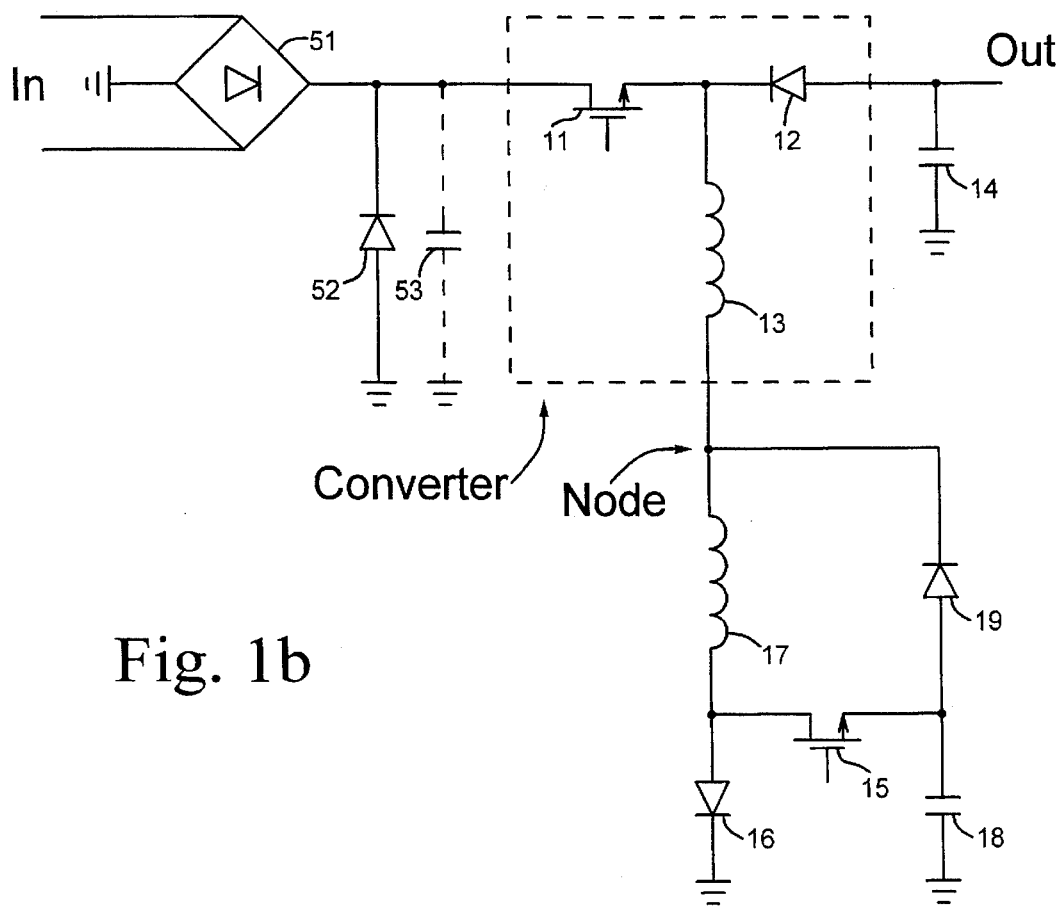
FIG. 1b is an embodiment with a pair of inductors coupled to a node.

In FIG. 1b embodiment, the converter further includes the inductor 17 and diode 19, in FIG. 1b. The inductive means consists of the inductors 13 and 17 which are coupled in series and to a node. The diode 19 couples the node to the intermediate voltage. Moreover, the capacitor 14 is coupled to ground rather than capacitor 18 but remains coupled in series therewith thru ground. The negative intermediate voltage stored in the capacitor 18 intends to be higher than the negative SPS output voltage stored in the capacitor 14.

When V is above the threshold, the transistor 11 is switched on and off and transistor 15 is open. When the transistor 11 is closed, the diodes 12 and 16 are reverse and forward biased respectively. If the current of the inductor 13 is initially lower than current of the inductor 17, these currents are increased and decreased respectively, whereby the diode 19 conducts. At one point, both currents are equal and further increased, wherein the diode 19 is reverse biased. When the transistor 11 is open, the diodes 12 and 16 conduct the currents of the inductors 13 and 17 respectively. For instance, if the inductors 13 and 17 have equal values, the voltage across the diode 19 is substantially equal zero when the intermediate voltage is equal half the SPS output voltage. When V is below the threshold, the transistors 11 and 15 are switched on and off. The transistors 11 and 15 turn on preferably when currents of the inductors 13 and 17 are substantially even. The circuit operation is analogous, whereas the diode 16 is reverse biased while transistor 15 applies the intermediate voltage to the node.

Power failure protection is accomplished by means of the diode 52 which is coupled between V and ground. The diode 52 conducts when line fails. Generally, the SPS operates as if V has reached minimum value, i.e. zero, since the diode 52 conducts when V is substantially equal zero. The transistors 11 and 15 are switched on and off, wherein the capacitors 14 and 18 have large values as to deliver the energy. However, the voltage stored in the capacitor 18 may be small as to reduce voltage ratings of the switching components. The diode 52 may also conduct during zero crossings of the line voltage.

The optional capacitor 53 is coupled between the diode bridge 51 and ground, i.e. in parallel with diode 52. The capacitor 53 reduces input current spikes. This is due to the switching of the transistor 11 which is coupled in series with the rectified line voltage. The capacitor 53 has relatively small value so that the rectified line voltage is crudely filtered.

The SPS input current is the average current flowing thru the transistor 11. Due to this series coupling almost any shape of the current can be simulated. The SPS input current intends to be constant and equal 1.11 times the average load current as to accomplish the best possible performance. Moreover, the SPS input current remains constant within each half-wave of the line voltage even if the load current varies in a large range. The capacitor 14 acts as buffer between the SPS input and load. Moreover, the SPS output voltage can remain the same even when the peak value of V is increased. For instance, the SPS can operate in European countries, wherein a mechanical switch for determining the SPS output voltage is unnecessary.

The desired value of the constant SPS input current can be determined for each half-wave of the line voltage regardless of the actual value of the load current. The SPS input current may be equal:

$$AE+B \text{ or } I_{max}$$

whichever is smaller, where $$A=-2Cf \text{ and } B=2CfE_{max}$$

Imax is maximum allowable SPS input current, C is capacitance of the capacitor 14, f is frequency of the line voltage, Emax and E are maximum allowable and actual SPS output voltages respectively. Therefore, A and B have fixed values. The SPS has an inherent short circuit protection.

Figure 2A:
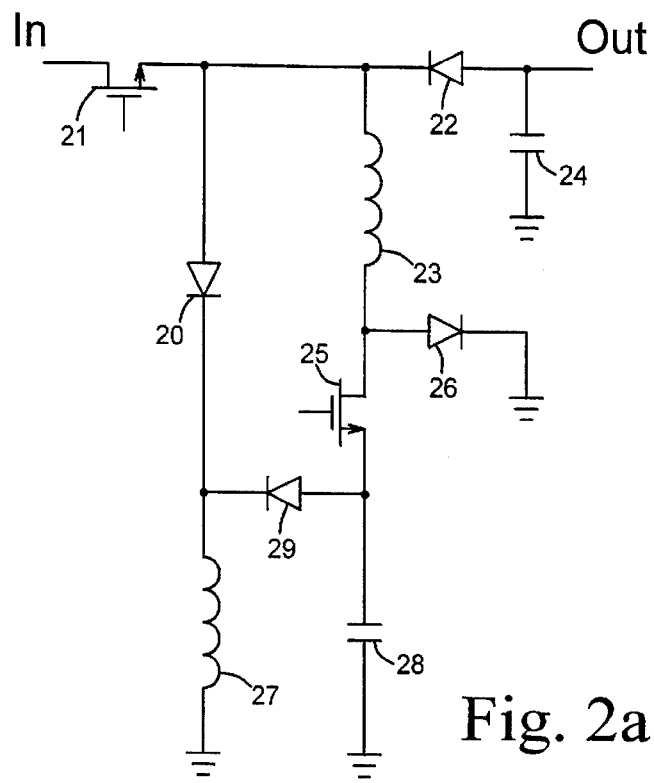
FIG. 2a is one embodiment with a pair of inductors effectively coupled in parallel, and including flyback type converter.

FIG. 2a is an embodiment with a pair of inductors being coupled in parallel. The components 51 thru 53 of FIGS. 1a and 1b can be coupled to the SPS input. In particular, V is applied thereto. The SPS includes a converter for converting a voltage appearing between the SPS input and a node into the SPS output voltage. The converter includes the n-channel MOSFET 21 for selectively applying V. The inductor 27 is coupled to ground for attaining a current. The capacitors 24 and 28 are coupled to ground for storing the SPS output voltage and a base voltage respectively. A rectifying means couples the inductor 27 to the transistor 21 and capacitor 28. The n-channel MOSFET 25 selectively applies the base voltage to node.

The converter is of flyback type and further includes the inductor 23 coupled between source of the transistor 21 and node for attaining a current. The diode 22 applies the inductor current to the SPS output. The diode 26 couples the node to ground. The negative base voltage stored in the capacitor 28 intends to be higher than the negative SPS output voltage stored in the capacitor 24. The rectifying means applies the current of the inductor 27 to the transistor 21 and/or intermediate voltage. Specifically, the diodes 20 and 29 have cathodes coupled to the inductor 27 and conduct the current thereof when the transistor 21 is closed and open respectively. However, the diode 20 may also conduct the inductor current when the transistor 21 is open and when the intermediate voltage is lower than or substantially equal to the SPS output voltage.

When V is above the threshold, the transistor 21 is switched on and off and transistor 25 is open. When the transistor 21 is closed, the inductors 23, 27 are charged and diodes 22, 29 are reverse biased. The diodes 20 and 26 conduct the currents of the inductors 27 and 23 respectively, which are thus effectively coupled in parallel across V. When V is below the threshold, the transistors 21 and 25 are switched on and off. When the transistors 21 and 25 are closed, the diodes 22, 26 and 29 are reverse biased. V and V increased by the intermediate voltage are applied across the inductors 27 and 23 respectively. Subsequently, the transistors 21 and 25 are turned off. The currents of the inductor 23 and 27 flow thru the diodes 22 and 29 as to charge the capacitors 24 and 28 respectively.

Figure 2B:
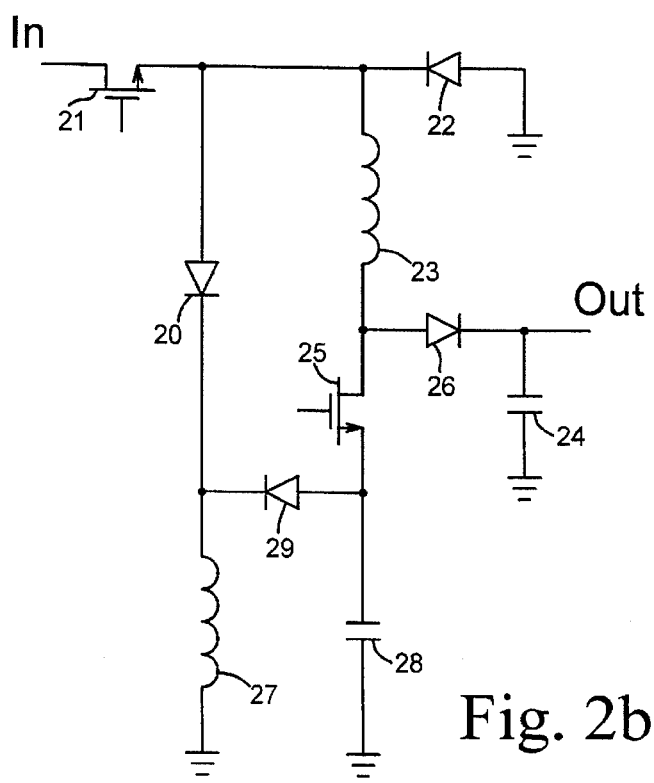
FIG. 2b is another embodiment with a pair of inductors effectively coupled in parallel, and including buck type converter.

In another embodiment, the converter is of buck type. With reference to the flyback converter, the buck configuration established by exchanging the diode 22 for inductor 23. Furthermore, the diode 22 is coupled to ground and the inductor 23, transistor 25 and diode 26 remain coupled to the node. FIG. 2b depicts this modification. In particular, the transistor 21 applies V to the inductor 23 which is further coupled to the capacitor 24 via the diode 26. In any case, the converter converts a voltage appearing between the SPS input and node. Accordingly, the voltage is equal V decreased by the SPS output voltage or V increased by the intermediate voltage, when the transistor 21 is closed, and transistor 25 is open and closed respectively.

Figure 3:
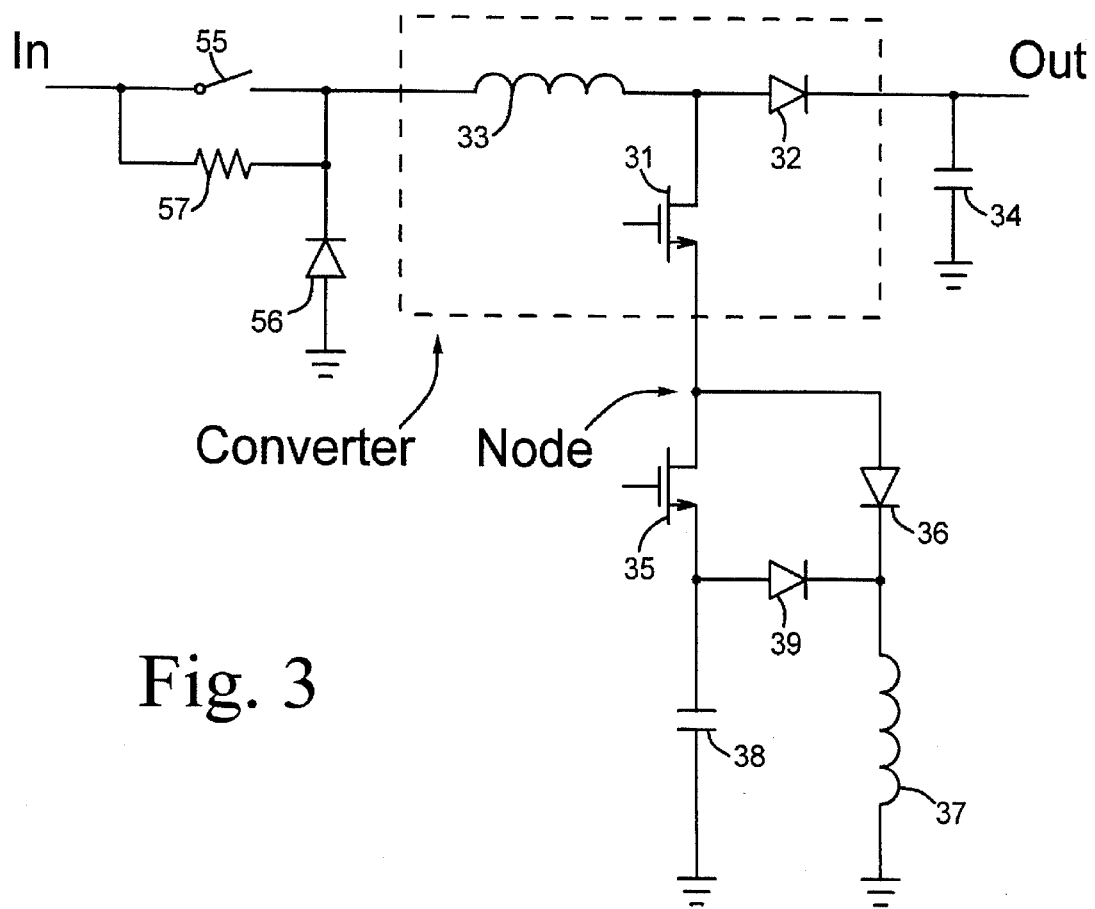
FIG. 3 is one embodiment with a pair of inductors effectively coupled in series, and including boost type converter.

FIG. 3 is one embodiment with a pair of inductors being coupled in series. The components 51 thru 53 of FIGS. 1a and 1b can be coupled to the SPS input. In particular, V is applied thereto. The SPS comprises a first converter which is coupled between the first input terminal and a node for converting a voltage appearing therebetween into the SPS output voltage which is referenced to ground. A second converter is coupled between the node and second input terminal for converting a voltage appearing therebetween into a intermediate voltage, and for applying the intermediate voltage between the node and second input terminal. A capacitor stores the intermediate voltage and is coupled to the second input terminal. With reference thereto, the intermediate voltage and voltage between the first and second input terminals have opposite polarities. The first and second input terminals are coupled to V and ground respectively.

The first converter is of boost type and converts a voltage appearing between V and node into the SPS output voltage. Specifically, the inductor 33 is coupled to V for attaining a current. The n-channel MOSFET 31 selectively couples the inductor 33 to the node. The diode 32 applies the inductor current to the capacitor 34. The capacitor 34 is coupled to ground and stores the SPS output voltage which is positive.

The second converter includes the inductor 37 coupled to ground for attaining a current. The capacitor 38 is coupled to ground and stores the intermediate voltage which is negative. A rectifying means couples the inductor 37 to the node and capacitor 38. Specifically, the diodes 36 and 39 have cathodes coupled to the inductor 37. The anodes of the diodes 36 and 39 are coupled to the node and capacitor 38 respectively. The n-channel MOSFET 35 selectively couples the capacitor 38 to the node, whereby the intermediate voltage is applied thereto. The second converter and capacitor 38 operate as a block having only two terminals.

When V is above a threshold, the transistor 31 is switched on and off and transistor 35 is open. When the transistor 31 is closed, the diode 36 conducts, whereby the inductors 33 and 37 are effectively coupled in series. If the current of the inductor 33 is greater than the current of the inductor 37, the diode 32 conducts and diode 39 is reverse biased. The currents of the inductors 33 and 37 are falling and rising respectively. In contrast, if the current of the inductor 33 is smaller than current of the inductor 37, the diode 32 is reverse biased and diode 39 conducts. The currents of the inductors 33 and 37 are rising and falling respectively. At one point, both currents are equal and further increased, wherein the diodes 32 and 39 are reverse biased. When the transistor 31 opens, the currents of the inductors 33 and 37 flow thru the diodes 32 and 39 as to charge the capacitors 34 and 38 respectively.

When V is below the threshold, the transistor 31 is switched on and off, whereas the transistor 35 is closed. When the transistor 31 is closed, the diode 32 is reverse biased and V increased by the voltage stored in the capacitor 38, i.e. intermediate voltage, is applied across the inductor 33. The diodes 36 and 39 are effectively coupled in parallel. If the current of the inductor 37 is greater than zero, the diodes 36 and 39 apply the inductor current to the capacitor 38. When the inductor current is zero, the diodes 36 and 39 are reverse biased. When the transistor 31 is open, the current of the inductor 33 flows thru the diode 32 as to charge the capacitor 34. The capacitor 34 is discharged thru a load coupled thereacross. The capacitor 38 is discharged only when the transistors 31 and 35 are closed. An excessive value of the intermediate voltage is prevented by increasing the threshold voltage.

The switch 55 is coupled in series with the inductor 33 for preventing an excessive current thereof. When the supply first turns on, the transistor 31 and switch 55 are open. The capacitor 34 is coupled to V via the diode 32, inductor 33 and further resistor 57 which eliminates the inrush current. The capacitor 34 is charged to the peak value of V. The switch 55 is closed once after any power failure and therefore a slow transistor or relay can be employed. The switch 55 shorts out resistor 57, whereby power dissipation thereof is negligible. Moreover, the switch 55 can be switched on and off as to charge the capacitor 34, whereby the resistor 57 is superfluous. When the switch 55 is open, the diode 56 applies the current of the inductor 33 to ground, wherein the capacitor 34 is charged. A comparator monitors the SPS output voltage, i.e. voltage across the capacitor 34. The switch 55 is closed if the capacitor voltage is near the peak value of V. The switch 55 can be open at any time, e.g. when V has a voltage spike.

Figure 4A:
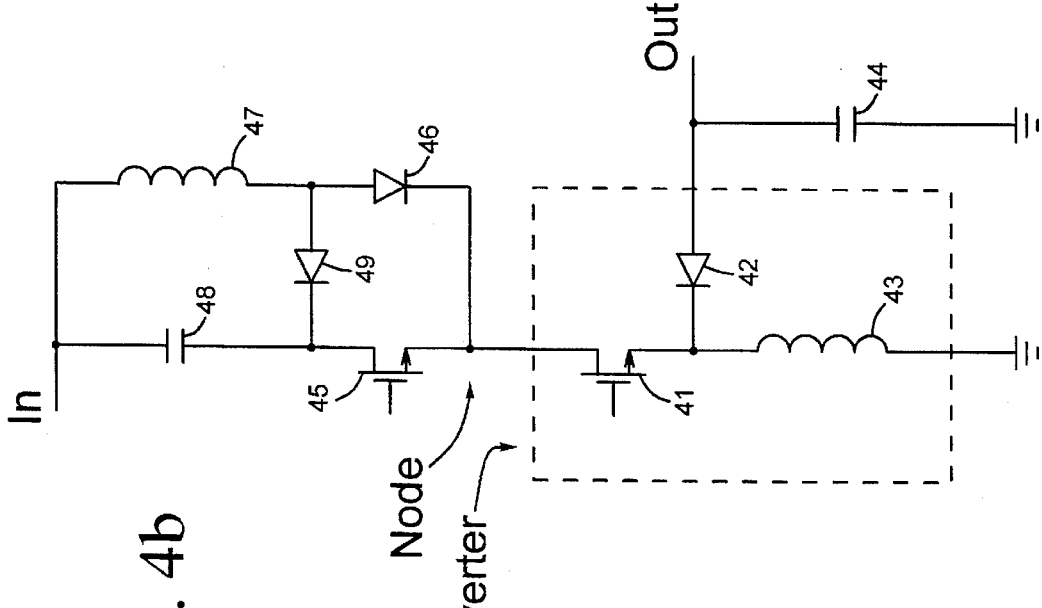
FIG. 4a is another embodiment with a pair of inductors effectively coupled in series, and including buck type converter.

FIG. 4a is another embodiment with a pair of inductors being coupled in series. The components 51 thru 53 of FIG. 1a and 1b can be coupled to the SPS input. In particular, V is applied thereto. Similarly to FIG. 3 embodiment, the SPS comprises the first converter which is coupled between the first input terminal and node for providing the SPS output voltage referenced to ground. The second converter is coupled between the node and second input terminal for obtaining and providing the intermediate voltage. A capacitor stores the intermediate voltage and is coupled to the second input terminal. With reference thereto, the intermediate voltage and voltage between first and second input terminals have opposite polarities. In contrast to FIG. 3 embodiment, the first and second terminals are coupled to ground and V respectively.

Figure 4B:
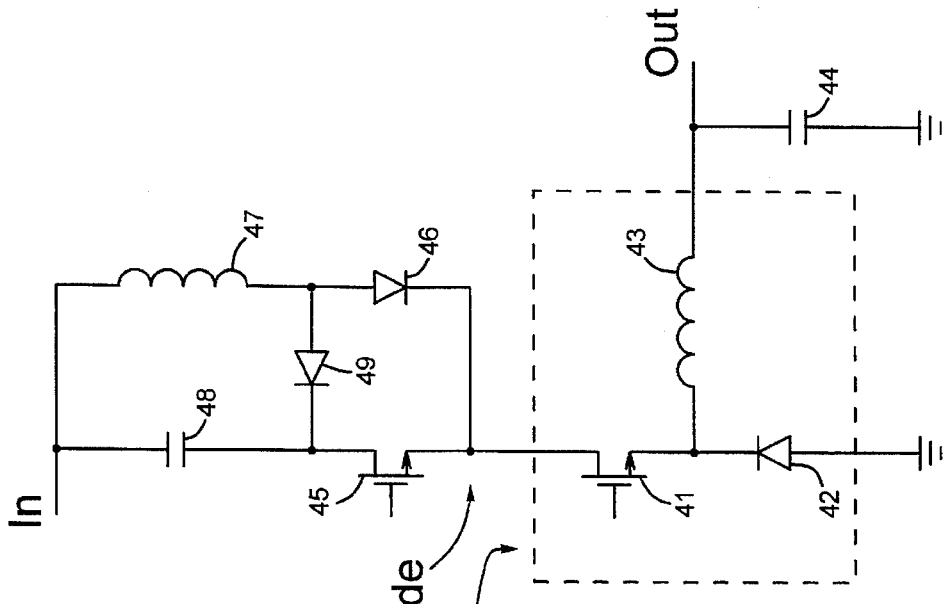
FIG. 4b is yet another embodiment with a pair of inductors effectively coupled in series, and including flyback type converter.

The first converter is of buck type and converts a voltage appearing between the node and ground into the SPS output voltage. Specifically, the inductor 43 is coupled to the SPS output for attaining a current. The n-channel MOSFET 41 selectively couples the inductor 43 to the node. The diode 42 applies the inductor current to ground. The capacitor 44 is coupled to ground and stores the SPS output voltage which is positive. The first converter can be also of flyback type as shown in FIG. 4b. With reference to the buck converter, the flyback configuration is established by exchanging the diode 42 for inductor 43. The SPS output voltage is negative.

The second converter consists of the components 45 thru 47 and 49 which are coupled and operate as the components 35 thru 37 and 39 of FIG. 3 respectively. However, voltages appearing across the respective components are reversed. Specifically, the inductor 47 is coupled to V for attaining a current. The capacitor 48 is coupled to V and stores the intermediate voltage which is positive with reference to the SPS input. The diodes 46 and 49 have anodes coupled to the inductor 47. The cathodes of the diodes 46 and 49 are coupled to the node and capacitor 48 respectively. The n-channel MOSFET 45 selectively couples the capacitor 48 to the node, whereby the intermediate voltage is applied thereto. The second converter and capacitor 48 operate as a block having only two terminals.

When V is above a threshold, the transistor 41 is switched on and off and transistor 45 is open. When the transistor 41 is closed, the diode 46 conducts, whereby the inductors 43 and 47 are effectively coupled in series. In particular, if currents flowing thru the inductors 43 and 47 are even, the diodes 42 and 49 are reverse biased. Both currents increase. When the transistor 41 opens, the currents of the inductors 43 and 47 flow thru the diodes 42 and 49 as to charge the capacitors 44 and 48 respectively.

When V is below the threshold, the transistor 41 is switched on and off, whereas the transistor 45 is closed. When the transistor 41 is closed, the diode 42 is reverse biased and V increased by the intermediate voltage and decreased by the SPS output voltage is applied across the inductor 43. In particular, if the current flowing thru the inductor 47 is equal zero, the diodes 46 and 49 are reverse biased. When the SPS output voltage or current of the inductor 43 has reached a desired value, the transistor 41 is turned off. The current of the inductor 43 flows thru the diode 42 as to charge the capacitor 44. The first converter can be also of flyback type as pointed out hereinabove, and shown in FIG. 4b.

The present invention represents a significant advance in the field of SPSs. In particular, FIGS. 1a, 1b, 2a, 2b, 3, 4a and 4b show SPSs capable of obtaining sinusoidal input current and stabilized output voltage. A variable output voltage can be accomplished by reducing value of the respective capacitor coupled across the load. Line voltage is universal and inrush current is eliminated. The short circuit protection is inherent. Smallest possible peak currents of switches result in best possible line and component utilizations at any time.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting an input voltage applied between an input terminal and ground into an output voltage appearing between an output terminal and first node, comprising:

a second node;

a first capacitive means coupled between the first node and ground for storing an intermediate voltage;

a first switching means coupled to the first node for selectively applying the intermediate voltage to the second node;

a diode means coupled to the second node for applying a voltage appearing thereat to ground;

an inductive means having a pair of terminals with one terminal coupled to the second node for attaining a current;

a second switching means coupled to the other terminal of the inductive means for selectively applying the current to the input terminal;

a rectifying means coupled to the other terminal of the inductive means for applying the current to the output terminal; and a second capacitive means coupled between the output terminal and the first node for storing and providing the output voltage.

2. Switching power supply of claim 1 further including a second rectifying means coupled to the input terminal for rectifying an auxiliary AC voltage and providing the input voltage.

3. Switching power supply of claim 1 further including a second rectifying means coupled between the input terminal and ground for conducting a current when the input voltage is substantially equal to zero.

4. Switching power supply of claim 1 further including an input capacitive means coupled between the input terminal and ground for reducing input current spikes.

* * * * *